United States Patent [19]
Chan et al.

[11] Patent Number: 6,085,269
[45] Date of Patent: Jul. 4, 2000

[54] CONFIGURABLE EXPANSION BUS CONTROLLER IN A MICROPROCESSOR-BASED SYSTEM

[75] Inventors: Tai-Yuen Chan, Allen; Steven D. Krueger, Dallas; Jonathan H. Shiell, Plano, all of Tex.

[73] Assignee: Texas Instruments Incorporated, Dallas, Tex.

[21] Appl. No.: 08/961,789

[22] Filed: Oct. 31, 1997

Related U.S. Application Data

[60] Provisional application No. 60/030,260, Oct. 31, 1996.

[51] Int. Cl.[7] .................................................. G06F 1/00
[52] U.S. Cl. ..................... 710/100; 710/101; 710/104; 710/105; 710/127
[58] Field of Search ................................ 710/100, 101, 710/104, 105, 127

[56] References Cited

U.S. PATENT DOCUMENTS

| | | | |
|---|---|---|---|
| 4,604,683 | 8/1986 | Russ et al. .............................. | 710/100 |
| 5,553,245 | 9/1996 | Su et al. ................................. | 710/104 |
| 5,617,572 | 4/1997 | Pearce et al. .......................... | 713/300 |
| 5,828,877 | 10/1998 | Pearce et al. .......................... | 709/1 |
| 5,881,247 | 3/1999 | Dombrosky et al. .................. | 710/100 |
| 5,926,404 | 7/1999 | Zeller et al. ........................... | 364/707 |

*Primary Examiner*—Ayaz R. Sheikh
*Assistant Examiner*—Eric S. Thlang
*Attorney, Agent, or Firm*—Robert D. Marshall, Jr.; W. James Brady, III; Frederick J. Telecky, Jr.

[57] ABSTRACT

A host module (2) including a host CPU (10) and a configurable expansion bus controller (28, 28', 128) is disclosed. The expansion bus controller (28, 28', 128) is configurable by way of configuration signals (BCFG) to be operable in various bus configurations for communicating signals between a module bus (IBUS) and external buses (XPCI1, XPCI0). These modes include combining the external buses (XPCI1, XPCI0) into a single bus of the 64-bit PCI type, operating the external buses (XPCI1, XPCI0) as separate 32-bit PCI buses, as separate CardBus buses, as separate AGP buses (either at one or multiple data transfers per cycle), or as combinations thereof. Certain of the configuration signals (BCFG) are used to select the clock frequencies at which the external buses (XPCI1, XPCI0) operate, in either of the 64-bit or 32-bit PCI protocols, or in the AGP bus protocol when present. The external buses (XPCI1, XPCI0) may be operable at different speeds, and at different protocols, depending upon the state of the configuration signals (BCFG).

17 Claims, 6 Drawing Sheets

CONFIGURABLE EXPANSION BUS CONTROLLER IN A MICROPROCESSOR-BASED SYSTEM

CROSS-REFERENCE TO RELATED APPLICATIONS

This application claims benefit of Provisional Appl. No. 60/030,260, filed Oct. 31, 1996.

STATEMENT REGARDING FEDERALLY SPONSORED RESEARCH OR DEVELOPMENT

Not applicable.

BACKGROUND OF THE INVENTION

This invention is in the field of computers, and is more specifically directed to bus interface circuitry in microprocessor-based computers such as personal computers and workstations.

As well understood by those in the art, many various bus configurations and protocols are now used, in modern personal computers, portable personal computers, and workstations, for communicating data among the central processing unit (host CPU) and peripheral devices such as memory, disk storage, input/output devices, and, in a multiprocessor system, other CPUs. These multiple bus configurations have resulted from the competing desires of maintaining compatibility of the computer system with older-generation peripheral cards (implemented according to the ISA, EISA, and other older parallel bus standards, such buses generically referred to herein as "legacy" buses), and of providing the performance capability of newer-generation buses, such as the well-known Peripheral Controller Interface (PCI) bus as described in the PCI Local Bus Specification R2.1 from the PCI SIG (Special Interest Group). The special requirements of peripheral devices for portable computers have spawned the development and implementation of even more bus protocols, including the well-known PCMCIA bus, and a 32-bit variant thereof referred to in the art as the "CardBus" bus (CardBus being a trademark of the Personal Computer Memory Card International Association).

Figure 1:
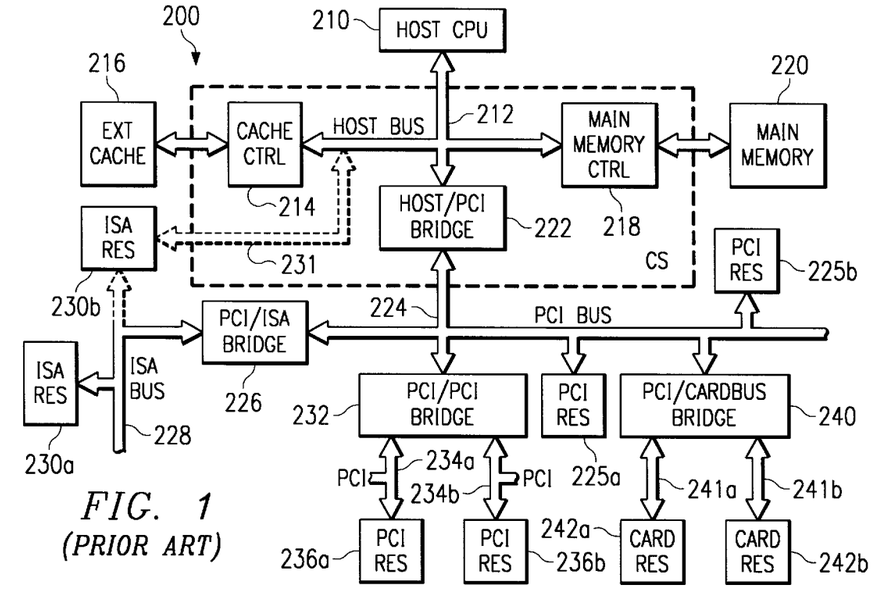
FIG. 1 is an electrical diagram, in block form, of a microprocessor-based computer system according to the prior art.

Conventional computer systems typically include interface "chipsets", typically installed in the computer system on the same main circuit board (i.e., "mother board"). These interface chipsets include multiple integrated circuits for interfacing the external bus of the host CPU (typically referred to as the "host bus"), with the various peripheral and system devices. FIG. 1 illustrates a conventional microprocessor-based computer system 200, as an exemplary arrangement of a host CPU 210, the interface chipset CS, and the various buses that are used in connection with conventional computers. System 200 of FIG. 1 is presented herein by way of example and for description purposes only, it being understood that conventional systems may be constructed with more or fewer resources than shown in FIG. 1, and in various differing arrangements.

Host CPU 210 in system 200 of FIG. 1 is a conventional microprocessor as currently used in modern, high-performance, personal computers, workstations, and portable computers; for example, host CPU 210 may be an x86-architecture microprocessor of the so-called P5 or P6 class (corresponding, for example, to the PENTIUM and PENTIUM PRO microprocessors available from Intel Corporation). Host CPU 210 communicates with the other elements of system 200 primarily by way of host bus 212; host bus 212 operates according to the particular external bus protocol driven by host CPU 210, as known in the art. Typically, host bus 212 is a lightly-loaded bus, implemented with a "back-plane" of minimum length to minimize bus loading and losses and thus to maintain high speed data transfer.

Chipset CS in system 200 of FIG. 1 includes several separate integrated circuits, typically mounted on the mother board of system 200 along with host CPU 210, each providing an interface between host bus 212 and a system resource. In this example, chipset CS includes cache controller 214, which controls communication of data between host CPU 210 and external cache memory 216, typically implemented as high-speed static RAM, and serving as a level-2 or level-3 cache memory depending upon the internal architecture of host CPU 210. Chipset CS further includes main memory controller 218, which controls communication of data between host CPU 210 and main memory 220, which is typically implemented as banks of dynamic RAM.

Chipset CS in system 200 further includes host/PCI bridge 222, which provides an interface between host bus 212 and a first-level PCI bus 224. PCI bus 224, as is known in the art, is a high-speed, synchronous, bus-mastered-architecture, system bus for providing high-speed data communications among system resources. PCI resources 225a, 225b are illustrated as resident on first-level PCI bus 224, and represent such system resources as high-performance graphics display systems, additional expansion memory, disk storage systems, and other CPUs, in multiprocessor systems. In modern systems, PCI buses are 32-bit buses, operating at either 33 MHz or 66 MHz frequencies using address and data multiplexing, with the capability of 64-bit data transfer provided by an additional level of multiplexing. Current PCI protocols also permit the use of either 5 volt or 3.3 volt logic levels in the 33 MHz mode; only the 3.3 volt level is permissible in 66 MHz operation. Host/PCI bridge 222 is a conventional device known in the art for interfacing PCI bus 224 to host bus 222. In this capacity, host/PCI bridge 222 is necessarily responsible for reformatting the commands, address, and data signals communicated from one bus to another; modern implementations of host/PCI bridge 222 also contain logic to combine commands and to prefetch data, for improved system performance.

Additional levels of buses are provided in system 200 in a hierarchical manner, thus providing system 200 with the ability to use resources of different bus types, and also to reduce the loading on the higher speed buses nearer host CPU 210. In this example, system 200 includes PCI/ISA bridge 226 which is connected between first-level PCI bus 224 and ISA bus 228. ISA bus 228 has ISA resources 230a, 230b resident thereupon, such resources referred to as "legacy" resources (and ISA bus 228 as a "legacy" bus), indicating the older bus protocol with which they operate. PCI/ISA bridge 226, as known in the art, is a resource that reformats signals when communicated from bus-to-bus, and which may also include logic for combining commands and prefetching data.

System 200 also includes PCI/PCI bridge 232 which interfaces first-level PCI bus 224 to two second-level PCI buses 234a, 234b, upon which PCI resources 236a, 236b are respectively resident. PCI/PCI bridge 232 is a known device in the art that is often referred to as a PCI "splitter", as it provides, in this example, interface control between multiple lower-level PCI buses 234 and higher-level PCI bus 224. PCI/PCI bridge 232 thus enlarges the number of potential PCI resources available in system 200 without unduly loading first-level PCI bus 223, and also permits PCI buses 224, 234a, 234b to operate according to different clock speeds, data widths, and logic levels, such options available under the PCI specification.

By way of further background, system 200 in this example also includes PCI/CardBus bridge 240, for interfacing first level PCI bus 224 to CardBus resources 242a, 242b resident on separate CardBus buses 241a, 241b, respectively. As noted above, CardBus buses are variants of the PCMCIA buses, and are particularly suitable for use in portable computers to implement peripherals such as disk drives, modems, and the like. PCI/CardBus bridge 240 is also a known device in the art, such as the PCI1130 CardBus controller available from Texas Instruments Incorporated, which interfaces PCI bus 224 to resources of either the CardBus or PCMCIA type, at either 3.3 volt or 5 volt logic levels.

By providing a standard for high-speed, master-driven, bus architecture, the PCI bus standard is intended to reduce the number of local bus protocols that may otherwise be generated in the marketplace. However, as illustrated in FIG. 1, many different bus types are still utilized in modern personal computers, workstations, and portable computers, even within individual systems. Further, as noted above, the PCI bus itself has several options, including different bit widths, different bus clock rates, and different logic level standards. Accordingly, the size, speed, and protocol of expansion buses continue to proliferate in the field.

It is desirable, from a system cost standpoint, to integrate as many system functions as possible into a single integrated circuit, either of the single-chip type or of the multi-chip module type (i.e., multiple integrated circuit chips assembled into a single integrated circuit package). However, the proliferation of different bus protocols and standards has heretofore rendered integration of the bus interface functions difficult according to conventional techniques, which necessitate the manufacture of host CPUs with different bus interface functions.

By way of further background, one type of configurable bus controller component has been implemented in SparcStation 10 and SparcStation 20 workstations sold by Sun Microsystems, Inc. This bus controller, referred to a Multi-Cache Controller and manufactured by Texas Instruments Incorporated under the part number TMS390Z55, is configurable in that it is selectably configured to interface a host CPU with one or the other of two mutually exclusive bus protocols.

BRIEF SUMMARY OF THE INVENTION

It is therefore an object of the invention to provide a configurable expansion bus controller that may support multiple bus protocols and yet be closely integrated with a host microprocessor.

It is a further object of the present invention to provide such a bus controller having the configurable capability of selectably driving either a single wide bus, or alternatively multiple buses of reduced bit width.

It is a further object of the present invention to provide such a bus controller having the capability of driving multiple buses according to different clock speeds relative to one another.

It is a further object of the present invention to provide a system having such a bus controller with the above-noted capabilities.

Other objects and advantages of the present invention will be apparent to those of ordinary skill in the art having reference to the following specification together with its drawings.

The present invention may be implemented into a microprocessor system by way of a configurable expansion bus controller that is closely integrated with the host central processing unit (CPU) of the system. The expansion bus controller receives a bus from the CPU on one side, and is configured, by way of control signals, to interface with a single bus, or with multiple buses of narrower bit width. In the case where the bus controller interfaces with multiple buses, the multiple buses may be of similar or different types, and may be driven at the same or at different bus clock frequencies.

DETAILED DESCRIPTION OF THE INVENTION

As will become apparent from the following description, it is contemplated that the present invention is preferably implemented into a closely integrated fashion, particularly relative to the proximity of certain of the functions therein. Methods of implementing such close integration include the integration of functions into the same integrated circuit chip (i.e., unitary semiconductor element), and also the assembly of multiple integrated circuit chips within a single integrated package so as to appear as a single integrated circuit chip to the external system. In either case, this close integration provides the important benefit of providing a high level of functionality with relatively low pin count, which is especially desirable considering the high cost (both system cost and device cost) of extremely large pin count devices, such as those exceeding 208 pins according to current technology. Further relative to such close integration, it is contemplated that various functions may or may not be implemented in a particular combination, it being understood that the following description is provided by way of example only. Furthermore, while it is contemplated that the benefits of the present invention will be especially advantageous when such close integration of the circuit elements is used in realization of the present invention, particularly in the case of the central processing unit and expansion bus controller described hereinbelow, it is further contemplated that the present invention extends to other implementations as well.

Figure 2:
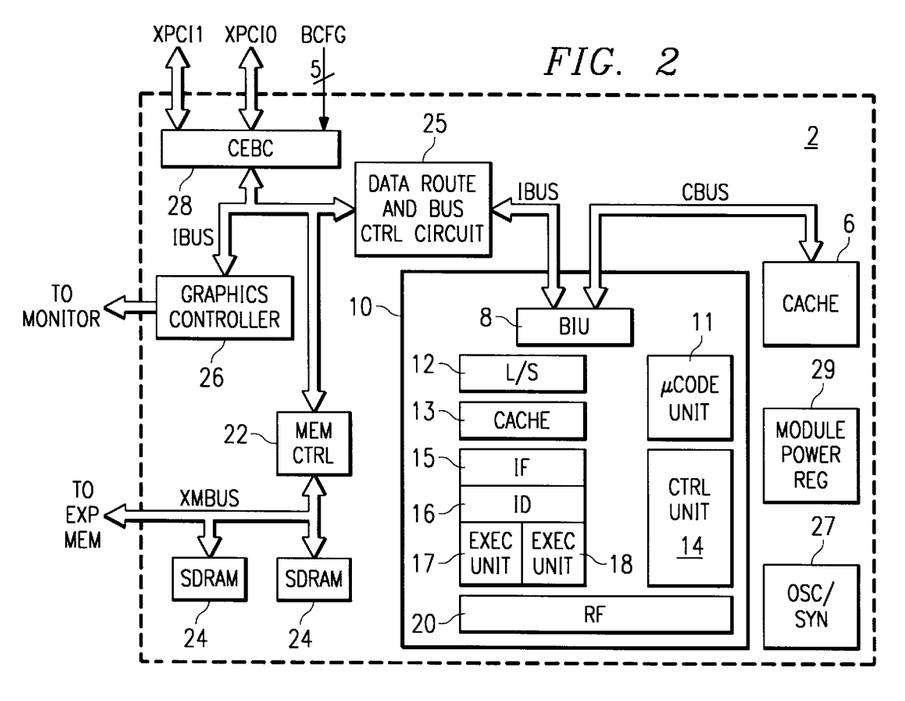
FIG. 2 is an electrical diagram, in block form, of a host central processing unit multi-chip module according to a first embodiment of the present invention.

FIG. 2 illustrates a host central processing module 2 according to a first embodiment of the present invention, in which host module 2 represents a multi-chip module. For purposes of this description, the term "multi-chip module", as well-known in the art, refers to a single integrated circuit package within which two or more integrated circuit chips are implemented. In this example, host module 2 includes superscalar CPU 10 which is a high-performance microprocessor capable of executing sequences of program instructions upon digital data, in the conventional manner. According to this example, CPU 10 is of the well-known x86-architecture, preferably of a capability consistent with the so-called P5 or P6 classes of microprocessor; of course, CPU 10 may be implemented according to variations upon this architecture, or according to architectures other than the x86-architecture.

According to this exemplary embodiment of the invention, CPU 10 includes various functional circuitry of the x86 architecture type to perform a sequence of data processing instructions. CPU 10 is of the superscalar type, and as such is capable of issuing and executing multiple instructions in parallel absent resource conflicts or data dependencies. As such, CPU 10 includes multiple execution units 17,18, each of which include circuitry for performing operand fetch, execution, and writeback operations by way of one or more arithmetic or logic units. Execution units 17,18 may each be integer execution units, or one may be a floating-point unit and the other an integer unit; of course, additional execution units may also be implemented within CPU 10, as desired for the particular architecture. Load/store units 12 are included within CPU 10 to control memory access for loading instructions from, and communicating data between, internal cache memory 13 or memory external to CPU 10 as will be described hereinbelow. CPU 10 is of the pipelined type, and as such instruction fetch circuitry 15 and instruction decoder 16 support one or more instruction pipelines. Instruction decoder 16 decodes instructions fetched by fetch circuitry 15 from cache 13, or alternatively microcode instructions generated by microcode unit 11 and applied to fetch circuitry 15, into control signals communicated to and applied by control unit 14 to control the operation of CPU 10. CPU 10 also includes register file 20, which includes the usual named x86 architecture registers for retaining data, control, and status information.

CPU 10 includes bus interface unit (BIU) 8 for controlling the communication of data to and from CPU 10, for example by way of module bus IBUS. Module bus IBUS is a bus for communicating address, data, and control signals among the various constituent blocks of host module 2. In this example, module bus IBUS passes through data route and bus control circuitry 25, which is circuitry that controls the traffic among the various system elements on module bus IBUS. It is contemplated that one of ordinary skill in the art will be able to realize data route and bus control circuitry 25 according to conventional techniques, as appropriate for the particular system; for example, data route and bus control circuitry 25 may be implemented as a simple crossbar, or alternatively may be implemented as a more complex bus arbiter and control circuit that does not intercept module bus IBUS. For purposes of this example, module bus IBUS refers to the internal module bus by way of which host CPU 10 communicates with other module elements in module 2.

One such system element that is connected to module bus IBUS, within host module 2, is memory controller 22. Memory controller 22, in the multi-chip module arrangement of host module 2, is an integrated circuit, constructed according to conventional techniques, which controls the communication of data to and from module bus IBUS and main module memory 24, which is preferably implemented within host module 2 as synchronous DRAM. Memory controller 22 communicates with main module memory 24, and with expansion memory connected externally to host module 2, by way of memory bus XMBUS.

Host module 2 also may include other special system resources resident on module bus IBUS. For example, host module 2 of FIG. 1 according to this preferred embodiment of the invention includes graphics controller 26, which may be implemented as a high-performance graphics processor and adapter for performing graphics operations such as line draw, fill, bit block transfers, and the like, and for presenting the results to a graphics monitor. Of course, other elements of different types may also be included within host module 2, as desired by the system architect.

According to this embodiment of the invention, BIU 8 of host CPU 10 is also in communication with cache memory 6 by way of cache bus CBUS, which is a separate bus from module bus IBUS in this example. Cache memory 6 is a level-2 or level-3 cache, depending upon the levels of cache provided within CPU 10, for locally storing data and instructions that are either recently used or likely to be used in the particular instruction sequences being executed by CPU 10. Alternatively, cache 6 may be coupled to CPU 10 by away of module bus IBUS.

General control, timing, and power circuitry is also included within host module 2. For example, host module 2 includes on-module oscillator/synchronization circuitry 27 for generating and applying the appropriate clock signals to the resources in host module 2, and module power regulator circuit 29 for ensuring the application of the appropriate power levels to the various resources of host module 2. Other conventional system control resources will also be included within host module 2, as typical in the art.

According to the preferred embodiment of the invention, host module 2 further includes configurable expansion bus controller 28, coupled between module bus IBUS internal to host module 2, and external buses XPCI0, XPCI1 which communicate address, data, and control signals between resources in host module 2 and external system resources. Buses XPCI0, XPCI1 according to this embodiment of the invention are each capable of operating as a full 32-bit PCI bus, operating at either a low frequency (e.g., 33 MHz) or at a high frequency (e.g., 66 MHz) according to the current PCI standard; in addition, buses XPCI1, XPCI0 are capable of operating in combination with one another as a 64-bit wide PCI bus, also at either the high or low frequency. Further, each of buses XPCI0, XPCI1 may operate as lower-performance buses, for example according to the CardBus standard which, as discussed above, is a 32-bit variant upon the PCMCIA bus standard for portable computer peripherals, and operates at a frequency corresponding to the low frequency of the PCI standard (e.g., 33 MHz).

External buses XPCI1, XPCI0 include multiplexed address and data lines, and also control lines, with the names and functions of the lines specified according to the particular configuration mode. Assignment of the signal lines for buses XPCI1, XPCI0, in the modes of 64-bit PC, 32-bit PCI, and CardBus, are as follows:

|  | 64-bit PCI Mode | 32-bit PCI Mode | CardBus Mode |
|---|---|---|---|
| XPCI1: AD[31:0] | AD[63:32] | AD[31:0] | AD[31:0] |
| XPCI1: CBE[3:0] | CBE[7:4] | CBE[3:0] | CBE[3:0] |
| XPCI1: Control | not used | PCI Control | CardBus Control |
| XPCI0: AD[31:0] | AD[31:0] | AD[31:0] | AD[31:0] |
| XPCI0: CBE[3:0] | CBE[3:0] | CBE[3:0] | CBE[3:0] |
| XPCI0: Control | PCI Control | PCI Control | CardBus Control |

As evident from the foregoing table, a full parallel 64-bit PCI bus mode is obtained according to the preferred embodiment of the invention by expansion bus controller 28 configuring buses XPCI1, XPCI0 to operate in combination with one another, such that the address, data, and CBE (command/byte enable) lines of bus XPCI1 serve as the higher order address, data, and CBE lines when in the 64-bit PCI mode; in this mode, the control signals associated with bus XPCI0 serve as the control signals for the entire 64-bit bus, and as such the control signals of bus XPCI1 are not used. Alternatively, when buses XPCI1, XPCI0 operate as separate 32-bit buses, either in the PCI or CardBus modes, the address, data, CBE, and control lines of each of the buses XPCI1, XPCI0 operate independently from one another.

The configuration of buses XPCI1, XPCI0 is selected by expansion bus controller 28 in response to configuration lines BCFG from external to host module 2. Configuration lines BCFG are preferably power-on-time signals, for example generated merely by hardwiring external conductors on a mother board containing host module 2 to a power supply voltage or to ground. In this example, five configuration lines BCFG[4:0] are used to indicate the desired configuration of external buses XPCI1, XPCI0, and the operating clock frequency of each bus.

Figure 3:
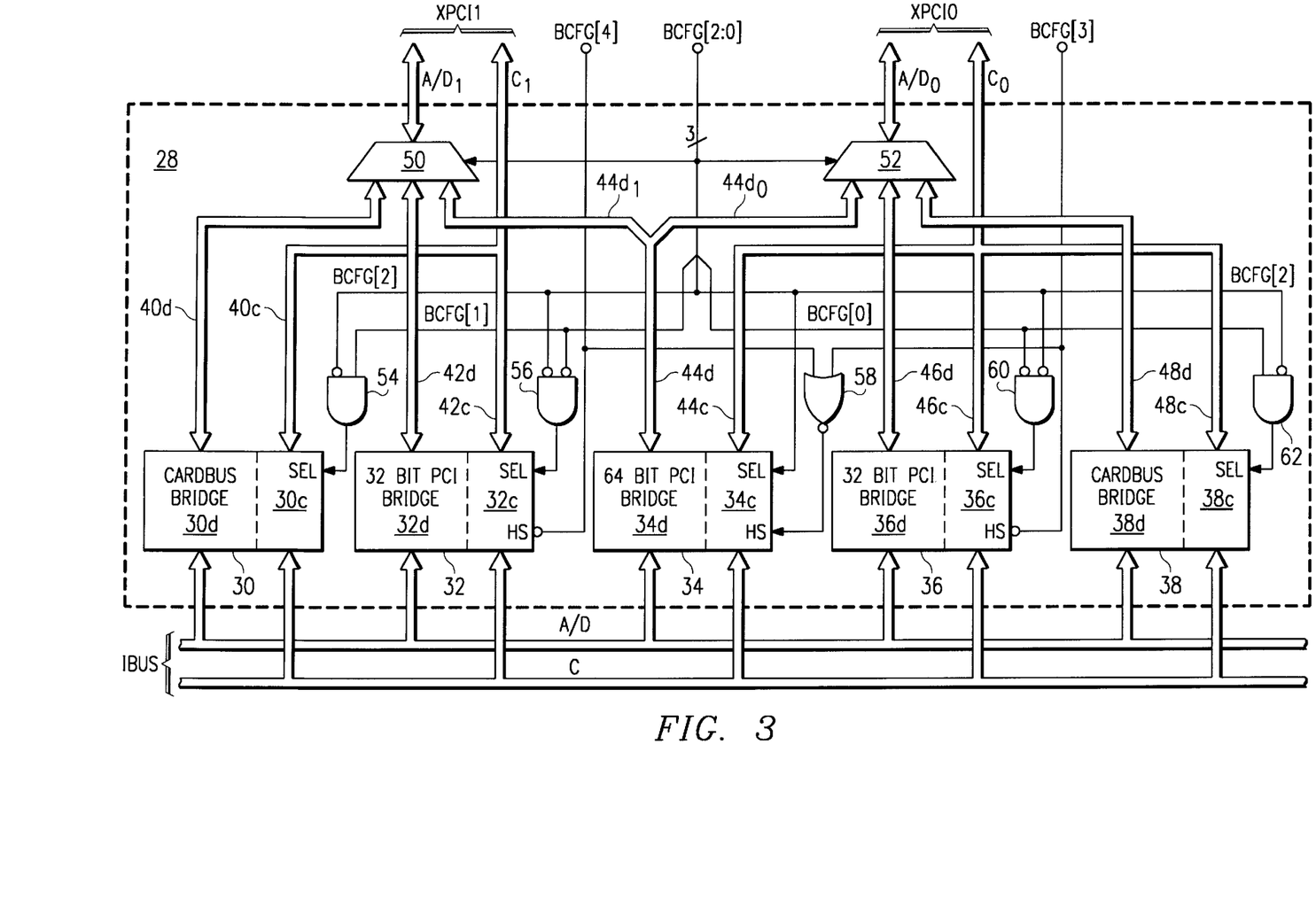
FIG. 3 is an electrical diagram, in block form, of the construction of a configurable expansion bus controller according to a first embodiment of the invention.

Referring now to FIG. 3, the construction of configurable expansion bus controller 28 according to a first embodiment of the present invention will now be described. As known in the art for bus bridge circuits for memory-mapped communication, as performed by expansion bus controller 28, address, data, and control signals must all be communicated from bus to bus, in both directions. Accordingly, module bus IBUS includes address/data portions A/D and control portions C, each of which are applied to bridges 30, 32, 34, 36, 38 as will now be described.

As illustrated in FIG. 3, expansion bus controller 28 includes, associated with external bus XPCI1, CardBus bridge 30 including a data portion 30*d* and a control portion 30*c*, and 32-bit PCI bridge 32 including a data portion 32*d* and a control portion 32*c*. Similarly, associated with external bus XPCI0, expansion bus controller 28 includes 32-bit PCI bridge 32 including a data portion 36*d* and a control portion 36*c*, and CardBus bridge 38 including a data portion 38*d* and a control portion 38*c*. Expansion bus controller 28 further includes 64-bit PCI bridge 34, having a data portion 34*d* associated with both of buses XPCI1, XPCI0, and a control portion 34*c* associated with external bus XPCI0 only.

Data bridge portions 30*d*, 32*d*, 34*d*, 36*d*, 38*d* are preferably constructed according to conventional bridge circuit techniques for effecting bidirectional data communication between their associated two buses. For example, each data bridge portion 30*d*, 32*d*, 34*d*, 36*d*, 38*d* preferably includes a primary bus unit and a secondary bus unit assigned arbitrarily to one of the buses to which the bridge is connected. Each of the primary and secondary units preferably include a prefetch buffer, generally including a first-in-first-out memory (FIFO), for retrieving and temporarily storing expected data to be communicated from its associated bus (when operating as a source bus), and a posting buffer, also typically implemented as a FIFO, for receiving and temporarily storing data to be communicated to its associated bus (when serving as the destination bus). Each of data bridge portions 30*d*, 32*d*, 34*d*, 36*d*, 38*d* also typically include data paths for bidirectional communication of signals between the primary and secondary units, and also the appropriate driver circuitry for applying the communicated data and address information at the appropriate logic levels.

Of course, data bridge portions 30*d*, 32*d*, 34*d*, 36*d*, 38*d* may be constructed according to alternative techniques. For example, some amount of the functional circuitry within data bridge portions 30*d*, 32*d*, 34*d*, 36*d*, 38*d* may be shared; specifically, considering that not all of data bridge portions 30*d*, 32*d*, 34*d*, 36*d*, 38*d* will be enabled, FIFO buffering on the module bus IBUS side may be shared among data bridge portions 30*d*, 32*d*, 34*d*, 36*d*, 38*d*, reducing the chip area required for expansion bus controller 28 while slightly increasing the complexity of select circuitry therewithin. Other realizations of data bridge portions 30*d*, 32*d*, 34*d*, 36*d*, 38*d* will, of course, become apparent to those of ordinary skill in the art having reference to this specification.

Each data bridge portion 30*d*, 32*d*, 34*d*, 36*d*, 38*d* receives address and data lines A/D from module bus IBUS; similarly, control portions 30*d*, 32*d*, 34*d*, 36*d*, 38*d* each receive control lines C from module bus IBUS. Data bridge portions 30*d*, 32*d*, 34*d* are also connected to corresponding data buses 40*d*, 42*d*, 44*d* that are in turn connected to bidirectional multiplexer 50, with only the portion 44$d_1$ of data bus 44*d* being applied to multiplexer 50. Conversely, data bridge portions 34*d*, 36*d*, 38*d* are connected to bidirectional multiplexer 52 by way of corresponding data buses 44*d*, 46*d*, 48*d*, with only the portion 44$d_0$ of data bus 44*d* applied to multiplexer 52. Bidirectional multiplexers 50, 52 may, if desired, include the appropriate input and output buffering for interfacing with external buses XPCI1, XPCI0 in the configured manner. The address and data lines A/D from module bus IBUS, as well as the corresponding data buses 40*d*, 42*d*, 44*d*, 46*d*, 48*d* presented by the corresponding bridges 30*d*, 32*d*, 34*d*, 36*d*, 38*d*, carry address and data signals in time-multiplexed fashion, as consistent with the particular bus protocol associated therewith. In the case of PCI buses (i.e., buses 42*d*, 44*d*, 46*d*), command and byte enable signals (i.e., the "CBE" signals according to the PCI specification), are communicated by data bridge portions 42*d*, 44*d*, 46*d*, in combination with the address and data signals. As such, each of data buses 40*d*, 42*d*, 44$d_1$, 44$d_0$, 46*d*, 48*d* include at least thirty-two address/data lines and four CBE lines, as necessary for PCI operation.

Bidirectional multiplexer 50 selects one of buses 40d, 42d, 44d₁ for bidirectional communication with address/data lines A/D₁ of external bus XPCI1, while bidirectional multiplexer 52 selects one of buses 44d₀, 46d, 48d for bidirectional communication with address/data lines A/D₀ of external bus XPCI0. The selection performed by multiplexers 50, 52 is controlled by the states of control lines BCFG[2:0], which are a subset of configuration lines BCFG. Bidirectional multiplexers 50, 52 may be constructed according to the conventional manner for such circuit functions, for example as pass-gate multiplexers to allow data to flow in either direction. Alternatively, the multiplexer function may be merely performed by wired-OR connection of the corresponding data buses (i.e., buses 40d, 42d, 44d₁ wired together, and buses 44d₀, 46d, 48d wired together), assuming that the data bridge portions associated with non-selected buses are controlled so as to have their corresponding buses in a high-impedance state.

According to this embodiment of the invention, only one bridge associated with each of bidirectional multiplexers 50, 52 is selected by configuration lines BCFG[2:0]; in the case of 64-bit PCI bridge 34, its selection applies to both of bidirectional multiplexers 50, 52. The selection of bridges 30, 32, 34, 36, 38 according to this example is made according to the following truth table:

| BCFG[2:0] | XPCI1 Selected Bridge | XPCI0 Selected Bridge | Bus Configuration |
|---|---|---|---|
| 1XX | 34 | 34 | 64-bit PCI bus |
| 000 | 32 | 36 | Dual 32-bit PCI buses |
| 001 | 32 | 38 | XPCI1: 32-bit PCI XPC0: CardBus |
| 010 | 30 | 36 | XPCI1: CardBus XPC0: 32-bit PCI |
| 011 | 30 | 38 | Dual CardBus |

Each of control bridge portions 30c, 32c, 34c, 36c, 38c have a select input SEL that is controlled according to the state of configuration lines BCFG[2:0] in this example, in a manner consistent with the selections made by multiplexers 50, 52 as indicated in the above truth table. According to this embodiment of the invention, therefore, select input SEL of CardBus control bridge 30c receives the output of AND function 54, which receives the logical complement of configuration line BCFG[2] and the true state of configuration line BCFG[1]. Select input SEL of 32-bit PCI control bridge 32c receives the output of AND function 56, which receives the logical complements of configuration lines BCFG[1] and BCFG[2] at its inputs. Select input SEL of 64-bit PCI control bridge 32c simply receives the state of configuration line BCFG[2]. Select input SEL of 32-bit PCI control bridge 36c receives the output of AND function 60, which receives the logical complements of configuration lines BCFG[2] and BCFG[0] at its inputs. Finally, select input SEL of CardBus control bridge 38c receives the output of AND function 62, which receives the logical complement of configuration line BCFG[2] and the true state of configuration line BCFG[0] at its inputs. This logic arrangement thus corresponds to the truth table for multiplexers 50, 52 noted hereinabove.

In the case of external bus XPCI1, control bridge portions 30c, 32c receive control signal lines C from module bus IBUS, and generate the corresponding control signals on control buses 40c, 42c, respectively, according to the associated CardBus and PCI standard, respectively. Similarly, for external bus XPCI0, control bridge portions 34c, 36c, 38c receive control signal lines C from module bus IBUS, and generate the corresponding control signals on control buses 44c, 46c, 48c for their associated buses. In this embodiment of the invention, control buses 40c, 42c are wired-OR connected with one another to form the control signal portion C₁ of external bus XPCI1, and control buses 44c, 46c, 48c are wired-OR connected with one another to form the control signal portion C₀ of external bus XPCI0. In this embodiment of the invention, each control bridge portion 30c, 32c 34c, 36c, 38c places its associated control bus 40c, 42c, 44c, 46c, 48c into a high-impedance state when unselected by configuration lines BCFG[2:0].

According to this embodiment of the invention, each of PCI bridges 32, 34, 36 are capable of generating address, data, and control signals for application to the external buses XPCI1, XPCI0 in either high-frequency or low-frequency mode, according to the state of the signal applied to their clock control input HS. In this embodiment of the invention, the high-frequency mode corresponds to 66 MHz, while the low-frequency mode corresponds to 33 MHz; of course, the specific bus clock frequencies will depend upon the particular prevailing industry standards, typically limited by the speed of the external resources to which the external buses XPCI1, XPCI0 are connected.

The selection of the speeds at which the external buses are to operate are selected by configuration signals BCFG[4:3], as illustrated in FIG. 3. In this embodiment of the invention, 64-bit PCI bridge 34 operates in high-frequency mode if both of configuration signals BCFG[4:3] are at a low logic level, and as such input HS of control bridge 34c receives the output of NOR function 58, which receives configuration signals BCFG[4:3] at its inputs. The inputs HS of 32-bit control bridge portions 32c, 36c receive the logical complement of configuration lines BCFG[4], BCFG[3], respectively, such that the state of these configuration lines BCFG[4:3] independently control the frequency of operation of buses XPCI1, XPCI0 when in 32-bit PCI modes. CardBus control bridges 30c, 38c, are only capable of low-frequency operation, and as such have no inputs HS associated therewith.

In operation, configurable expansion bus controller 28 may configure external buses XPCI1, XPCI0 in various ways, depending upon the state of configuration lines BCFG [4:0] which, as noted above, are preferably set at power-on time simply by hardwiring to the desired voltage levels on the mother board containing host module 2. Examples of the various system implementations available will now be described relative to FIGS. 4a through 4e, in combination with FIG. 3.

Figure 4A:
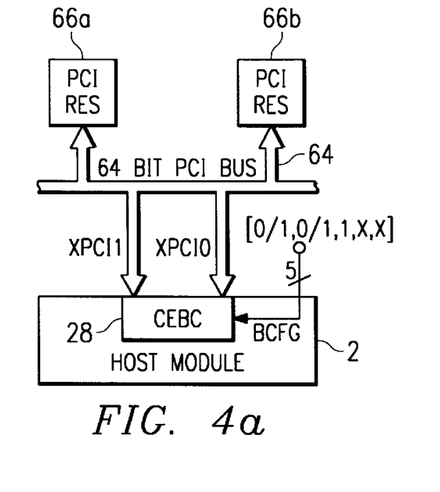
FIG. 4a is an electrical diagram, in block form, of a microprocessor based computer system according to a configuration of the expansion bus controller of FIG. 3 in which a single 64-bit PCI bus is interfaced with the host module of FIG. 2.

FIG. 4a illustrates the case where expansion bus controller 28 is placed into 64-bit PCI mode. As described hereinabove, this mode is selected by configuration line BCFG[2] being at a high logic level; the state of configuration lines BCFG[1:0] are don't cares in this mode. In this mode, referring back to FIG. 3, 64-bit PCI bridge 34 is selected, and all other bridges 30, 32, 36, 38 are deselected. Address/data lines A/D of internal bus IBUS are thus placed in bidirectional communication with address/data lines A/D₁ of external bus XPCI1 (as the higher-order lines in the 64-bit PCI bus), and with address/data lines A/D₀ of external bus XPCI0 (as the lower-order lines in the PCI bus). Control lines C of module bus IBUS are used, by control bridge portion 34c, to generate the appropriate control signals for PCI bus operation, as applied to control lines C₀ of external bus XPCI0; control lines C₁ of bus XPCI1 are in a high-impedance state (bridges 30, 32 both deselected);

conversely, control signals from control lines $C_0$ of bus XPCI0 are communicated by control bridge portion 34c to module bus IBUS, as necessary.

The frequency at which expansion bus controller 28 operates is determined by the states of configuration lines BCFG[4:3], as described hereinabove. If either of configuration lines BCFG[4:3] are high, control bridge portion 34c will cause operation to be in low-frequency mode; if neither are high, control bridge portion 34c will operate in the high-frequency mode, which is contemplated to be on the order of 66 MHz.

FIG. 4a illustrates a system implementation of this configuration of expansion bus controller 28. In this example, buses XPCI1, XPCI0 cooperatively form a 64-bit PCI bus 64, upon which PCI resources 66a, 66b that are capable of 64-bit PCI protocol communication with host module 2 (which includes host CPU 10, as described above) may reside. Of course, more than two such resources 66a, 66b may reside on bus 64; in fact, it is contemplated that a PCI bus "splitter" (i.e., PCI/PCI bridge) may itself reside on bus 64, providing further hierarchical bus arrangements of PCI resources.

Figure 4B:
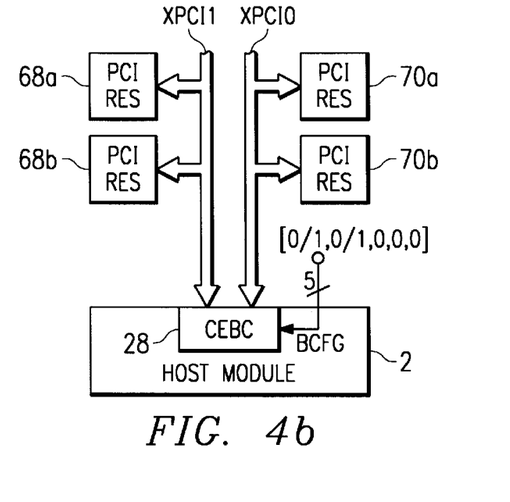
FIG. 4b is an electrical diagram, in block form, of a microprocessor based computer system according to a configuration of the expansion bus controller of FIG. 3 in which dual 32-bit PCI buses are interfaced with the host module of FIG. 2.

FIG. 4b illustrates the case where expansion bus controller 28 is configured to drive two 32-bit PCI buses. This configuration is selected by configuration lines BCFG[2:0] being all low. In this condition, 32-bit PCI bridge 32 is selected, such that data bus 42d is selected for communication with bus XPCI1 through bidirectional multiplexer 50 and control lines 42c are activated for application to bus XPCI1; in addition, 32-bit PCI bridge 36 is also selected, so that data bus 46d is selected for communication with bus XPCI0 through bidirectional multiplexer 52, and so that control lines 46c are activated for application to bus XPCI0. All other bridges 30, 34, 38 in expansion bus controller 28 are deselected in this case. Accordingly, the system of FIG. 4b may be provided in this configuration, where 32-bit PCI resources 68a, 68b are resident upon bus XPCI1, and where 32-bit PCI resources 70a, 70b are resident upon bus XPCI0.

The frequency with which each of buses XPCI1, XPCI0 operate are independently selected, by the states of configuration lines BCFG[4], BCFG[3], respectively, which are respectively coupled to inputs HS of bridges 32c, 36c. According to the preferred embodiment of the invention, buses XPCI1, XPCI0 may be at different frequencies from one another, or at the same frequency, depending primarily upon the capabilities of the resources 68, 70 attached thereto. Particularly if additional configuration lines are provided, it is contemplated that other options, such as selectable logic levels (e.g., 5 volt versus 3.3 volt), may be independently selected for use in connection with buses XPCI1, XPCI0. Accordingly, expansion bus controller 28 provides system flexibility, even where buses XPCI1, XPCI0 are configured as separate 32-bit PCI buses.

Figure 4C:
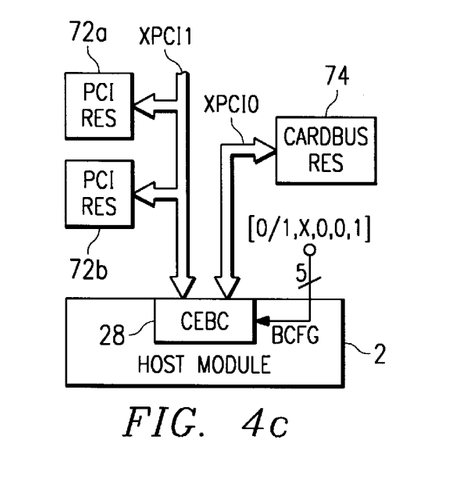
FIG. 4c is an electrical diagram, in block form, of a microprocessor based computer system according to a configuration of the expansion bus controller of FIG. 3 in which one 32-bit PCI bus and one CardBus bus are interfaced with the host module of FIG. 2.

FIG. 4c illustrates a system according to another configuration of expansion bus controller 28. In this example, bus XPCI1 is configured as a 32-bit PCI bus, while bus XPCI0 is configured as a CardBus bus. As such, PCI resources 72a, 72b reside on bus XPCI1, while CardBus resource 74 resides on bus XPCI0. According to current CardBus specifications, only a single resource (or, conceivably, a bus "splitter") may reside on a CardBus bus; of course, in the event that the CardBus protocol is extended to support multiple devices, it is contemplated that multiple CardBus resources 74 could then reside on bus XPCI0. The configuration of FIG. 4c is selected by configuration lines BCFG[2:0] being in the 001 state, selecting 32-bit PCI bridge 32 and CardBus bridge 38 in expansion bus controller 28 (along with multiplexers 50, 52 selecting their corresponding data buses 42d, 48d), and deselecting bridges 30, 34, 36. In this configuration, the state of configuration line BCFG[4] determines whether bus XPCI1 operates at a high or low frequency. Since the CardBus standard, in this example, is only a low-frequency bus, no frequency selection is provided in this situation, and line BCFG[3] is thus a don't care.

Figure 4D:
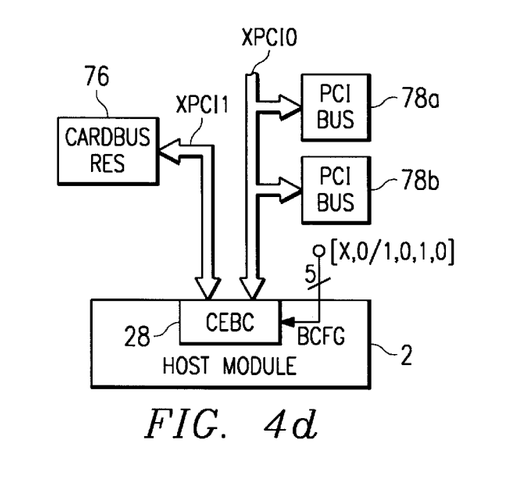
FIG. 4d is an electrical diagram, in block form, of a microprocessor based computer system according to a configuration of the expansion bus controller of FIG. 3 in which one 32-bit PCI bus and one CardBus bus are interfaced with the host module of FIG. 2, in a converse manner relative to the system of FIG. 4c.

FIG. 4d illustrates the converse situation from that of FIG. 4c, in which bus XPCI1 is configured as a CardBus bus and bus XPCI0 is configured as a 32-bit PCI bus, due to configuration lines BCFG[2:0] being at the 010 state. Bus XPCI0 may be in either the high or low frequency mode, as indicated by configuration line BCFG[3]. In this case, CardBus resource 76 is resident upon bus XPCI1, while 32-bit PCI resources are resident on bus XPCI0. In this case, bridges 30, 36 of expansion bus controller 28 are selected, and their respective data buses 40d, 46d selected by bidirectional multiplexers 50, 52, respectively; bridges 32, 34, 38 are deselected.

FIGS. 4c and 4d illustrate that expansion bus controller 28 according to the preferred embodiment of the invention is capable of being configured to communicate with buses of different types; in this example, the high-speed high-performance PCI bus and the lower performance CardBus bus. Further, expansion bus controller 28 may operate these buses at different frequencies, also readily configurable such as by way of hardwired configuration lines BCFG[4:3].

Figure 4E:
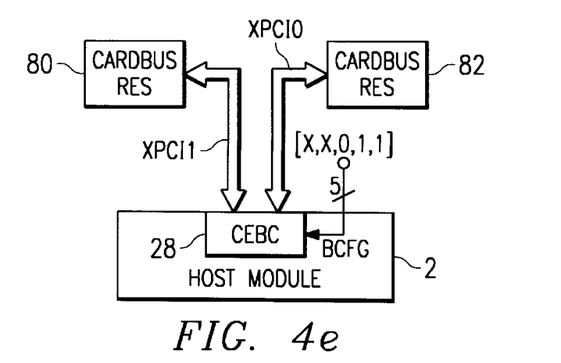
FIG. 4e is an electrical diagram, in block form, of a microprocessor based computer system according to a configuration of the expansion bus controller of FIG. 3 in which dual CardBus buses are interfaced with the host module of FIG. 2.

Referring now to FIG. 4e, expansion bus controller 28 is configured so that both of buses XPCI1, XPCI0 are CardBus buses. This configuration is selected by configuration lines BCFG[2:0] set to the state 011; since CardBus operation is only at low frequency, the state of configuration lines BCFG[4:3] are both don't cares. CardBus resources 80, 82, in this example, are resident on buses XPCI1, XPCI0, respectively. In this configuration, bridges 30, 38 are both selected, and their data buses 40d, 48d selected by bidirectional multiplexers 50, 52, respectively. Control bridges 30c, 38c each generate and receive CardBus protocol control signals from buses XPCI1, XPCI0, for communication with module bus IBUS in the appropriate manner.

As discussed above relative to FIG. 3, expansion bus controller 28 is constructed with separate data and control bridges for each bus mode (PCI, CardBus) for each output bus (XPCI1, XPCI0). It has been discovered, in connection with another embodiment of the present invention, that the frequency at which module bus IBUS and host CPU 10 operate is typically many times faster than the frequency at which bus traffic occurs, even for high performance buses such as the 64-bit 66 MHz PCI bus. This differential in operating frequencies is used to advantage according to another embodiment of the invention, as will now be described relative to FIG. 5.

Figure 5:
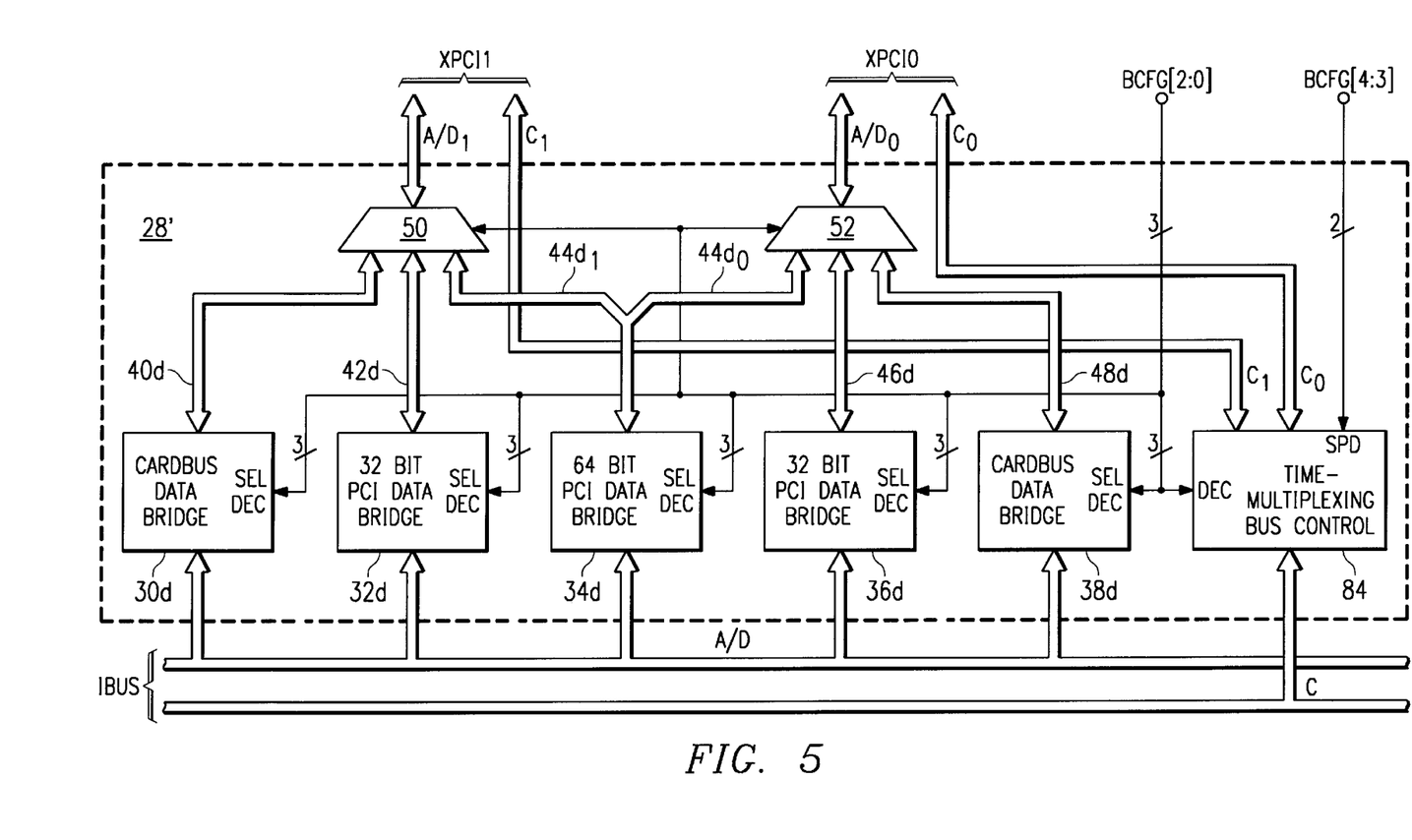
FIG. 5 is an electrical diagram, in block form, of the construction of a configurable expansion bus controller according to an alternative embodiment of the invention.

FIG. 5 illustrates expansion bus controller 28' according to a second embodiment of the present invention. Like elements in expansion bus controller 28' illustrated in FIG. 5 to those in expansion bus controller 28 illustrated in FIG. 3, are referred to by the same reference numerals. In expansion bus controller 28', five data bridges 30d, 32d, 34d, 36d, 38d are provided as before, for controlling communication between corresponding data buses 40d, 42d, 44d, 46d, 48d and address/data lines A/D of module bus IBUS, as before. Data buses 40d, 42d, 44d, 46d, 48d are applied to bidirectional multiplexers 50, 52, in the same manner as in configurable expansion bus controller 28 of FIG. 3; multiplexers 50, 52 select among these data buses for application to address/data lines A/D of external buses XPCI1, XPCI0, responsive to the states of configuration lines BCFG[2:0].

As before, bridges 30d, 38d are CardBus bridges associated with buses XPCI1, XPCI0, respectively; , bridges 32d, 36d are 32-bit PCI bridges associated with buses XPCI1, XPCI0, respectively; and bridge 34d is a 64-bit PCI bridge associated with both of buses XPCI1, XPCI0. Each of bridges 30d, 32d, 34d, 36d, 38d have a select decoder input SEL DEC, which receives configuration lines BCFG[2:0], according to which each bridge 30d, 32d, 34d, 36d, 38d determines whether or not it is selected, for example according to the same truth table as described hereinabove for expansion bus controller 28 of FIG. 3.

In expansion bus controller 28' according to this second embodiment of the invention, however, a single time-multiplexing bus control 84 is provided, for generating the desired bidirectional control signals associated with control buses $C_1$, $C_0$ of buses XPCI1, XPCI0, respectively. Bus control 84 receives (and applies) control signals to control lines C of module bus IBUS as well, to effect bidirectional communication between buses XPCI1, XPCI0 and module bus IBUS.

Time-multiplexing bus control 84 may be realized as sequential logic, for example by way of two separate state machines, for generating and receiving the appropriate control signals from either side. Because of the much higher rate at which address, data, and control signals are generated by host CPU 10 and other resident resources on module bus IBUS, it is contemplated that, through use of conventional sequential logic bus control 84 could readily be realized to generate the appropriate bus control signals, in any of the 64-bit PCI bus, 32-bit PCI bus, and CardBus modes (and combinations thereof, as described hereinabove relative to FIGS. 4a through 4e), in a time-multiplexed manner.

Selection of the control signal mode, for buses XPCI1, XPCI0, according to which bus control 84 is to operate, is determined from the state of configuration lines BCFG[2:01] applied to decode input DEC of bus control 84. Frequency configuration is selected according to the state of configuration lines BCFG[4:3], which are applied to input SPD of bus control 84. Bus control 84, for example according to the truth tables described hereinabove relative to expansion bus controller 28, includes decode circuitry for determining the states of configuration lines BCFG[4:0] and for controlling the sequential logic therein in the appropriate manner for generating the necessary control lines on buses XPCI1, XPCI0, and IBUS.

FIGS. 3 and 5 are intended to illustrate alternative implementations of the expansion bus controller according to the present invention, including a time-multiplexed implementation and a non-time multiplexed (i.e., a spatially-multiplexed) version. It is contemplated that those of ordinary skill in the art having reference to this specification may readily implement this functionality according to alternative approaches and combinations of time-multiplexing and spatial-multiplexing, without departure from the present invention. It is contemplated that one such alternative approach would include the further consolidation of the data bridge functions relative to FIGS. 3 and 5, for example by providing shared buffers on the host side of the expansion bus controller.

Figure 6:
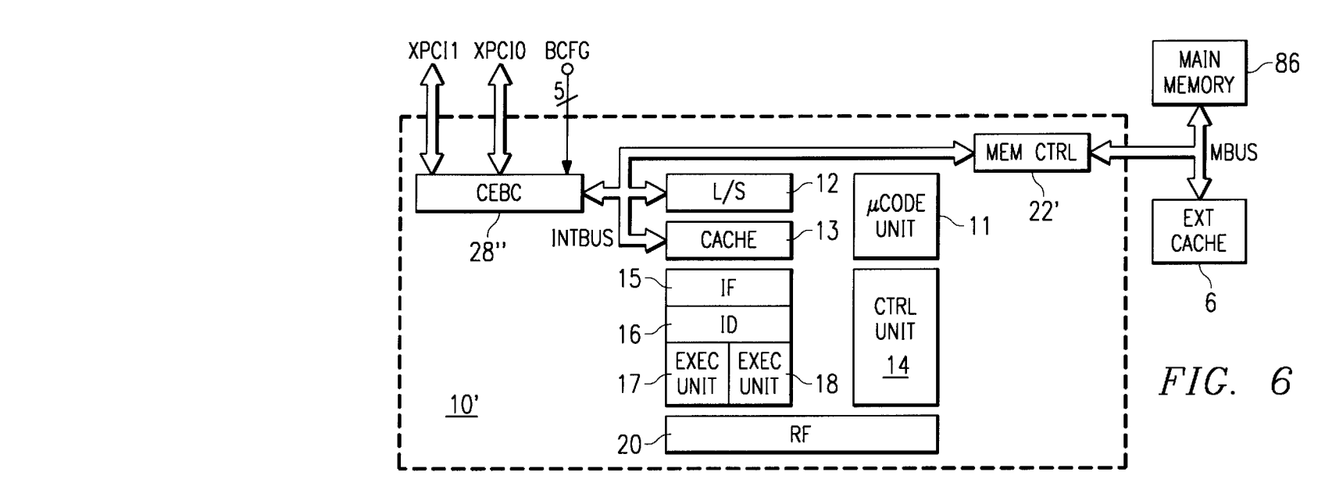
FIG. 6 is an electrical diagram, in block form, of a host central processing unit integrated circuit according to an alternative embodiment of the present invention.

As noted above, the embodiments of the invention described hereinabove closely integrate a configurable expansion bus controller with a host CPU by way of a multi-chip module. Referring now to FIG. 6, another alternative embodiment of the invention, in which the expansion bus controller and host CPU are closely integrated, onto the same integrated circuit chip, is illustrated. Again, like reference numerals are used to refer to the same elements as previously described relative to FIG. 2.

FIG. 6 illustrates host CPU chip 10' which, in this example, is also an x86-architecture microprocessor such as that of the P5 or P6 class; accordingly, many of the same internal elements of CPU 10' pertaining to the fetching and execution of instructions, are identical to those described hereinabove relative to FIG. 1. CPU 10' according to this embodiment of the invention also includes, however, on the same integrated circuit chip, memory controller 22' and configurable expansion bus controller 28", for effecting communication with external resources.

Memory controller 22' is connected to internal bus INTBUS, primarily to on-chip cache 13 and load/store units 12, for controlling access to external memory, including external cache memory 6 and main memory 86, both by way of memory bus MBUS. Such memory access will be effected in the event of a cache miss (relative to cache 13), or for non-cacheable reads and writes via load/store units 12, in the usual manner. Memory controller 22' thus may operate as a bus master on internal bus INTBUS, controlling memory accesses according to the desired protocol.

Configurable expansion bus controller 28" in this example is also connected to internal bus INTBUS, and controls communication with external resources via buses XPCI1, XPCI0, in the manner described hereinabove. The configuration of expansion bus controller 28" is preferably determined by the state of configuration lines BCFG[4:0], for example in the manner described hereinabove. As before, expansion bus controller 28" may be configured to operate buses XPCI1, XPCI0 as a single 64-bit PCI bus (at either high or low frequencies), or as separate buses of the same or different types, such as according to the 32-bit PCI bus and CardBus protocols, again at the same or different clock frequencies, logic levels and the like.

According to this alternative embodiment of the invention described relative to FIG. 6, therefore, the benefits of configurable expansion buses are obtained in a single-chip CPU, where the expansion bus controller is realized on the same chip as other host CPU functions. This single-chip integration is enabled by the functionality of the expansion bus controller according to the present invention that provides a wide range of flexibility in the configuration of the external buses, including bit width, clock frequency, logic levels, and other options.

Figure 7:
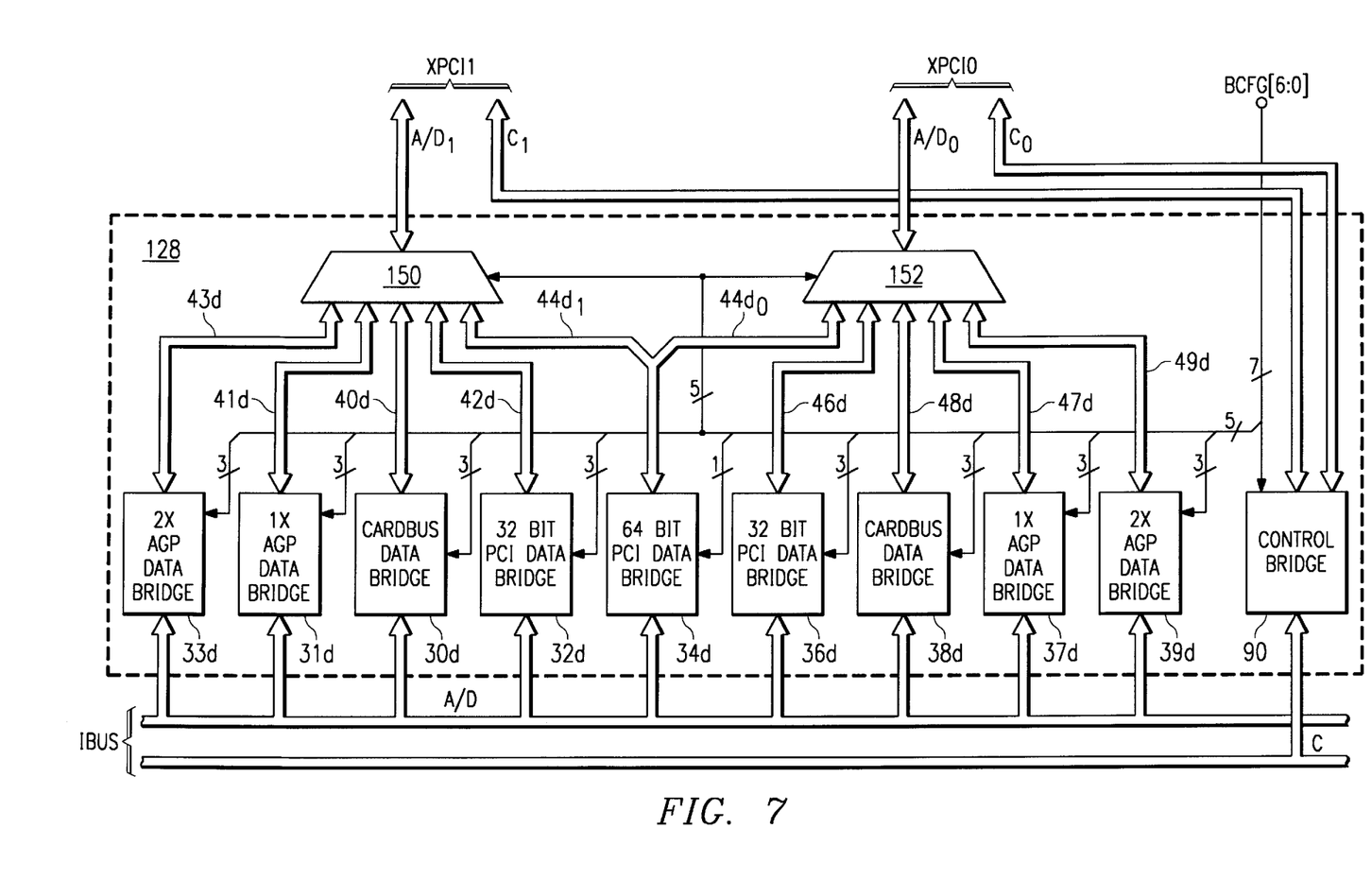
FIG. 7 is an electrical diagram, in block form, of the construction of a configurable expansion bus controller according to a further alternative embodiment of the invention.
Figure 8:
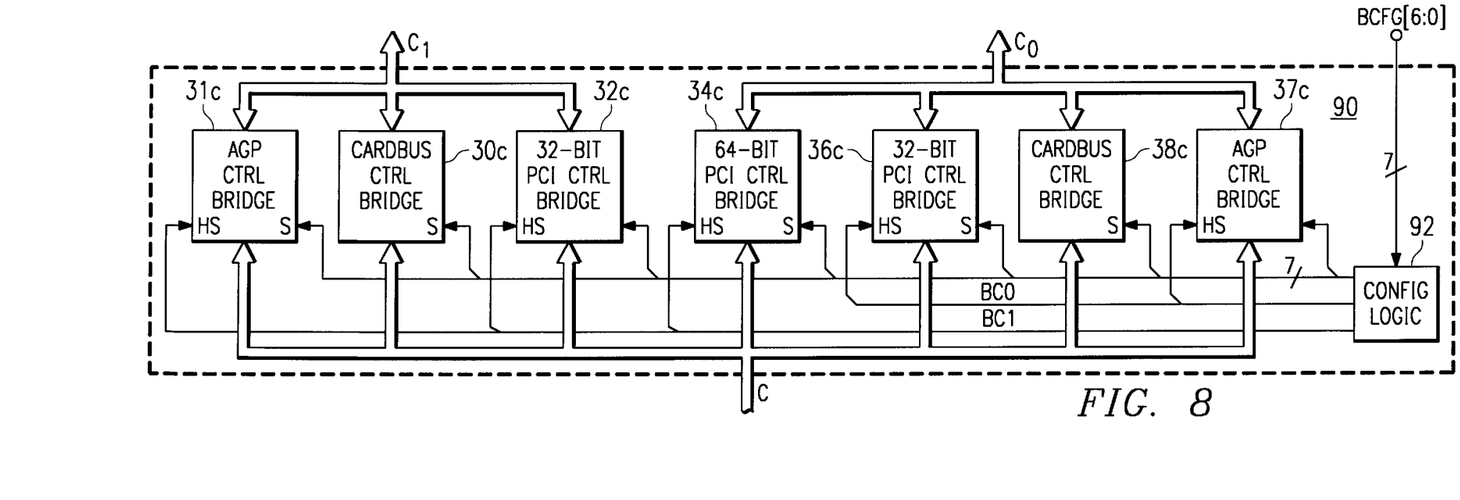
FIG. 8 is an electrical diagram, in block form, of the data bridge portion of the expansion bus controller of FIG. 7.

Referring now to FIGS. 7 and 8, the construction and operation of configurable expansion bus controller 128 according to a further alternative embodiment of the present invention will now be described in detail, with the same reference numerals used therein relative to the same elements as described hereinabove.

As shown in FIG. 7, expansion bus controller 128 includes data bridges 30d, 32d, 34d associated with external bus XPCI1, and data bridges 34d, 36d, 38d associated with external bus XPCI0, all coupled to lines A/D of module bus IBUS as before. In addition, expansion bus controller 128 also includes AGP 1X data bridge 31d and AGP 2X data bridge 33d, both coupled to lines A/D of module bus IBUS and associated with external bus XPCI1, and AGP 1X data bridge 37d and AGP 2X data bridge 39d, both coupled to lines A/D of module bus IBUS and associated with external bus XPCI0. AGP 1X data bridges 31d, 37d are configured as bridge circuitry for communicating data between module bus IBUS and address/data buses 41d, 47d, respectively, according to the well-known AGP standard, with data transferred once per bus cycle (e.g., on the rising edge of the bus clock). AGP 2X data bridges 33d, 39d communicate data between module bus IBUS and address/data buses 43d, 49d, respectively, also according to the AGP bus standard but with two data transfers per cycle (e.g., one transfer on the bus clock rising edge and another transfer on the bus clock falling edge).

Expansion bus controller 128 includes bidirectional multiplexers 150, 152, for selecting among the associated data bridge circuitry to be placed in communication with lines $A/D_1$, $A/D_0$ of external buses XPCI1, XPCI0, respectively. Bidirectional multiplexers 150, 152 effect such selection in response to the state of five configuration signals BCFG [4:0], in the manner to be described hereinbelow. In this example, buses 40d, 41d, 42d, 43d, and $44d_1$ are applied to bidirectional multiplexer 150, while buses $44d_0$, 46d, 47d, 48d, 49d are applied to bidirectional multiplexer 152. As before, buses $44d_1$, $44d_0$ respectively correspond to the upper and lower order portions at the output of 64 bit PCI data bridge 34d.

Each of data bridges 30d, 31d, 32, 33, 34, 336d, 37d, 38d, 39d have select inputs that receive the state of corresponding ones of configuration signals BCFG[4:0]; alternatively, decode circuitry may be provided externally to the data bridges to generate individual select signals. According to this exemplary embodiment of the invention, seven configuration signals BCFG[6:0] are received by expansion bus controller 128, the lower order five of which (BCFG[4:0]) configure the selection of the appropriate bus protocol or protocols for external buses XPCI1, XPCI0. In this example, configuration signal BCFG[4], when asserted, enables 64 bit PCI data bridge 34d to communicate address, data and byte enable signals and controls multiplexers 150, 152 to select data buses $44d_1$, $44d_0$, respectively. For external bus XPCI1, configuration signals BCFG[4:2], in combination, control the enabling of data bridges 30d, 31d, 32d, 33d, and 34d, and the corresponding selection by bidirectional multiplexer 150 as follows:

| BCFG[4:2] | Data bridge selected | XPCI1 Configuration |
|---|---|---|
| 1XX | 34d | Upper 32 bits of 64-bit PCI |
| 000 | 32d | 32-bit PCI |
| 001 | 30d | CardBus |
| 010 | 31d | 32-bit AGP (1X) |
| 011 | 33d | 32-bit AGP (2X) |

Similarly, for external bus XPCI0, configuration signals BCFG[4, 1:0] control the enabling of data bridges 34d, 36d, 37d, 38d, 39d and the selection made by bidirectional multiplexer 152, according to the following table:

| BCFG[4, 1:0] | Data bridge selected | XPCI0 Configuration |
|---|---|---|
| 1XX | 34d | Lower 32 bits of 64-bit PCI |
| 000 | 36d | 32-bit PCI |
| 001 | 38d | CardBus |
| 010 | 37d | 32-bit AGP (1X) |
| 011 | 39d | 32-bit AGP (2X) |

Control bridge 90 in expansion bus controller 128 according to this embodiment of the invention communicates control signals between control lines C of module bus IBUS and control buses $C_1$, $C_0$ of external buses XPCI1, XPCI0, respectively, as before, and also the bus clock frequency to be used, responsive to configuration signals BCFG[6:0], as will now be described relative to FIG. 8.

According to this embodiment of the invention, control bridge 90 includes control bridge portions 30c, 31c, 32c, associated with control lines $C_1$ of external bus XPCI1, and control bridge portions 34c, 36c, 38c, 37c associated with control lines $C_0$ of external bus XPCI0. AGP control bridge portion 31c is associated with both of AGP data bridges 31d, 33d, and as such generates and receives control signals associated with the AGP bus protocol, in both the 1X and 2X modes; similarly, AGP control bridge portion 37c is associated with both of AGP data bridges 37d, 39d for the same function. Each of control bridge portions 30c, 31c, 32c, 34c, 36c, 37c, 38c have a select input S receiving a decoded select signal from configuration logic 92. Configuration logic 90 receives configuration signals BCFG[6:0], and generates decoded select signals applied to select signals S according to the truth tables given hereinabove for the corresponding data portions. Of course, AGP control bridge 31c is selected when either of data bridges 31d, 33d are selected; similarly, AGP control bridge 37c is selected when either of data bridges 37d, 39d are selected.

According to this embodiment of the invention, as before, some of the available bus protocols may be operable in expansion bus controller 128 in both a high frequency and a low frequency mode. For example, the high frequency mode may operate with a bus clock of 66 MHz, while the low frequency mode may operate with a 33 MHz bus clock rate; particular frequencies utilized as the high and low frequency modes may differ from these exemplary values, of course, depending upon the prevailing bus standards. Each of control bridge portions 31c, 32c, 34c, thus have a high-speed input HS connected to control line BC1 generated by configuration logic 92 in response to configuration signal BCFG[6]; conversely, control bridge portions 36c, 37c also have a high-speed input connected to receive control line BC0, generated by configuration logic 92 responsive to configuration signal BCFG[5]. Control bridge portions 30c, 38c have no high-speed control inputs, as they can only operate at the lower bus clock frequency.

According to this embodiment of the invention, the truth table for selecting the bus frequency of the selected control bridge portions may be as follows:

| BCFG[6:5] | XPCI1 Frequency | XPCI0 Frequency |
|---|---|---|
| 00 | High | High |
| 01 | High | Low |
| 10 | Low | High |
| 11 | Low | Low |

In this embodiment of the invention, when 64-bit PCI mode is selected, control line BC1 controls the bus speed in 64-bit PCI mode (i.e., control line BC0 is don't care in this condition, as illustrated in FIG. 8).

As in the previously described embodiments of the present invention, when two separate buses are configured on external buses XPCI1, XPCI0, the two buses may operate at different bus clock frequencies, as indicated by the above table and by FIG. 8. According to this embodiment of the invention, an additional bus (in this example the AGP bus) may be readily implemented as a possible bus protocol, into expansion bus controller 128. As noted above, this bus protocol can include selectable data transfer rates, including multiple data transfers per cycle.

Other implementations of this alternative embodiment are also contemplated. For example, merely by adding and decoding an additional one of configuration signals BCFG, 2X data transfer modes may also be realized in the 64-bit and 32-BIT PCI standards, and in other standards. Further in the alternative, other bus protocol types (either legacy or otherwise) may be utilized in connection with the present invention.

According to the preferred embodiments of the invention described hereinabove, therefore, close integration of the expansion bus controller and the host CPU is obtained while still providing a high degree of flexibility in configuring the external bus or buses. The present invention enables the combination of multiple buses into a single wider bus when desired for system implementation, and also enables the communication with multiple buses of the same type, or of different type, depending upon the system architecture. It is therefore contemplated that the present invention will provide great flexibility in system implementation, while still obtaining high bus communication performance, and at reduced pin count and thus reduced system and device cost.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. Examples of such modifications include the configuration of a bus controller that operates more than two buses, generation of configuration signals in a dynamic manner such as by way of a configuration register, and other similar modifications. It is contemplated that such modifications and alternatives are within the scope of this invention as subsequently claimed herein.

We claim:

1. A microprocessor host module for a computer system, comprising:

a host CPU, for executing program instructions upon digital data, coupled to a module bus; and a configurable expansion bus controller, coupled to the module bus and to first data lines, first control lines, second data lines and second control lines, for communicating signals from the module bus to the first data lines, the first control lines, the second data lines and the second control lines according to one or more selected bus protocols, comprising:

configuration logic, for receiving configuration signals indicating the selection of bus protocols; and bridge circuitry, coupled on one side to the module bus and on another side to the first data lines, the first control lines, the second data lines and the second control lines, and coupled to the configuration logic so that, responsive to the configuration signals indicating a first configuration mode, the bridge circuitry communicates signals between the module bus and the first data lines, the first control lines and the second data lines according to a first bus protocol in which data conductors in the first data lines and second data lines cooperate as a single bus, and so that, responsive to the configuration signals indicating a second configuration mode, the bridge circuitry communicates signals between the module bus and the first data lines and first control lines according to a second bus protocol and separately communicates signals between the module bus and the second data lines and second control lines as an independent bus relative to the first data lines and first control lines.

2. The module of claim 1, wherein the configuration signals include frequency select signals coupled to the bridge circuitry, so that the bridge circuitry, in the first configuration mode, is also for selecting, responsive to the frequency select signals, the bus frequency at which the bridge circuitry communicates signals according to the first bus protocol.

3. The module of claim 2, wherein, the bridge circuitry, in the second configuration mode, is also for selecting, responsive to the frequency select signals, the bus frequency at which the bridge circuitry communicates signals between the module bus and the first data lines and said first control lines according to the second bus protocol.

4. The module of claim 2, wherein, responsive to the configuration signals indicating the second configuration mode, the bridge circuitry communicates signals between the module bus and the second data lines and the second control lines according to the second bus protocol;

and wherein, the bridge circuitry, in the second configuration mode, is also for selecting, responsive to the frequency select signals, the bus frequency at which the bridge circuitry communicates signals between the module bus and the second data lines and the second control lines according to the second bus protocol independently from selecting the bus frequency at which the bridge circuitry communicates signals between the module bus and the first data lines and the first control lines.

5. The module of claim 2, wherein, responsive to the configuration signals indicating the second configuration mode, the bridge circuitry communicates signals between the module bus and the second data lines and control lines according to a third bus protocol that differs from the second bus protocol, and at a bus frequency that differs from the selected bus frequency at which the bridge circuitry communicates signals between the module bus and the first data lines and the first control lines.

6. The module of claim 1, wherein the bridge circuitry comprises:

a first data bridge portion, coupled to data lines of the module bus and to the first data lines;

a second data bridge portion, coupled to data lines of the module bus and to the second data lines; and a third data bridge portion, coupled to data lines of the module bus and to the first data lines;

and wherein the configuration logic is coupled to the first, second, and third data bridge portions, and is for enabling the third data bridge portion responsive to the configuration signals indicating the first configuration mode, and is for enabling the first and second data bridge portions responsive to the configuration signals indicating the second configuration mode.

7. The module of claim 6, wherein the configuration logic comprises:

a first bidirectional multiplexer, coupled to the first and third data bridge portions and to the first data lines, and having control inputs coupled to receive the configuration signals; and a second bidirectional multiplexer, coupled to the second and third data bridge portions and to the second data lines, and having control inputs coupled to receive the configuration signals.

8. The module of claim 6, wherein the bridge circuitry further comprises:

a control bridge portion, coupled to control lines of the module bus and to the first control lines and the second control lines, and coupled to the configuration logic, for communicating control signals between the module bus and the first control lines and the second control lines according to the bus protocols indicated by the configuration signals.

9. The module of claim 8, wherein the control bridge portion of the bridge circuitry comprises:

a first control bridge portion, coupled to control lines of the module bus and to the first control lines and associated with the first data bridge portion;

a second control bridge portion, coupled to control lines of the module bus and to the second control lines and associated with the second data bridge portion; and a third control bridge portion, coupled to data lines of the module bus and to the first data lines and associated with the third data bridge portion;

and wherein the configuration logic is coupled to the first, second, and third control bridge portions, and is for enabling the third control bridge portion responsive to the configuration signals indicating the first configuration mode, and is for enabling the first and second control bridge portions responsive to the configuration signals indicating the second configuration mode.

10. The module of claim 8, wherein the control bridge portion of the bridge circuitry comprises:

a time-multiplexing bus control circuit, coupled to control lines of the module bus and to the first control lines and the second control lines, and to the configuration logic, for generating upon and receiving control signals from the first control lines and the second control lines according to the bus protocols indicated by the configuration signals.

11. A method of configuring a computer system, the computer system having a host module comprising a host central processing unit and a configurable expansion bus controller, the configurable expansion bus controller coupled within the host module to a module bus and connected to the first data lines, the first control lines, the second data lines and the second control lines, comprising the steps of:

applying configuration signals to the expansion bus controller indicating a selected one of a plurality of configuration modes;

responsive to the configuration signals indicating a first configuration mode, enabling bridge circuitry within the expansion bus controller to communicate signals between the module bus and the first data lines, the first control lines and the second data lines according to a first bus protocol in which the first data lines and the second data lines cooperate as a single bus;

responsive to the configuration signals indicating a second configuration mode, enabling the bridge circuitry to communicate signals between the module bus and the first data lines and the first control lines according to a second bus protocol, and enabling the bridge circuitry to separately communicate signals between the module bus and the second data lines and the second control lines independently from the signals communicated between the module bus and the first data lines and the first control lines.

12. The method of claim 11, wherein the expansion bus controller comprises a first data bridge portion, coupled to data lines of the module bus and to the first data lines, a second data bridge portion, coupled to data lines of the module bus and to the second data lines, and a third data bridge portion, coupled to data lines of the module bus and to the first data lines and to the second data lines;

wherein the step of enabling bridge circuitry responsive to the configuration signals indicating a first configuration mode comprises enabling the third data bridge portion;

and wherein the step of enabling bridge circuitry responsive to the configuration signals indicating a second configuration mode comprises enabling the first and second data bridge portions.

13. The method of claim 11, wherein the step of enabling the bridge circuitry responsive to the configuration signals indicating the second configuration enables the bridge circuitry to communicates signals between the module bus and the second data lines and the second control lines according to the second bus protocol;

and further comprising the step of:

responsive to the configuration signals indicating a third configuration mode, enabling the bridge circuitry to communicate signals between the module bus and the first data lines and the first control lines according to the second bus protocol, and enabling the bridge circuitry to communicate signals between the module bus and the second data lines and the second control lines independently from the signals communicated between the module bus and the first data lines and the first control lines and according to a third bus protocol differing from the second bus protocol.

14. The method of claim 11, wherein the step of applying configuration signals further comprises applying bus frequency selection signals to the expansion bus controller;

and wherein the method further comprises:

responsive to the configuration signals indicating the first configuration mode and to the bus frequency selection signals indicating a high frequency mode, operating the bridge circuitry to apply and receive signals from the first data lines, the first control lines and the second data lines according to the first bus protocol at a first frequency; and responsive to the configuration signals indicating the first configuration mode and to the bus frequency selection signals indicating a low frequency mode, operating the bridge circuitry to apply and receive signals from the first data lines, the first control lines and the second data lines according to the first bus protocol at a second frequency lower than the first frequency.

15. The method of claim 14, further comprising:

responsive to the configuration signals indicating the second configuration mode and to a first one of bus frequency selection signals indicating a high frequency mode, operating the bridge circuitry to apply and receive signals from the first data lines and the first control lines according to the second bus protocol at a first frequency; and responsive to the configuration signals indicating the second configuration mode and to the first one of the bus frequency selection signals indicating a low frequency mode, operating the bridge circuitry to apply and receive signals from the first data lines and the first control lines according to the first bus protocol at a second frequency lower than the first frequency.

16. The method of claim 11, wherein the step of enabling the bridge circuitry responsive to the configuration signals indicating the second configuration enables the bridge circuitry to communicates signals between the module bus and the second data lines and the second control lines according to the second bus protocol;

wherein the step of applying configuration signals further comprises applying bus frequency selection signals to the expansion bus controller;

and further comprising the steps of:

responsive to the configuration signals indicating a third configuration mode, enabling the bridge circuitry to communicate signals between the module bus and the first data lines and the first control lines according to the second bus protocol, and enabling the bridge circuitry to communicate signals between the module bus and the second data lines and the second control lines independently from the signals communicated between the module bus and the first data lines and the first data lines and according to a third bus protocol differing from the second bus protocol;

responsive to the configuration signals indicating the first configuration mode and to the bus frequency selection signals indicating a high frequency mode, operating the bridge circuitry to apply and receive signals from the first data lines, the first control lines and the second data lines according to the first bus protocol at a first frequency; and responsive to the configuration signals indicating the first configuration mode and to the bus frequency selection signals indicating a low frequency mode, operating the bridge circuitry to apply and receive signals from the first data lines, the first control lines and the second data lines according to the first bus protocol at a second frequency lower than the first frequency;

responsive to the configuration signals indicating the third configuration mode and to a first one of bus frequency selection signals indicating a high frequency mode, operating the bridge circuitry to apply and receive signals from the first data lines and the first control lines according to the second bus protocol at a first frequency; and responsive to the configuration signals indicating the third configuration mode and to the first one of the bus frequency selection signals indicating a low frequency mode, operating the bridge circuitry to apply and receive signals from the first data lines and the first control lines according to the first bus protocol at a second frequency lower than the first frequency.

17. The method of claim 16, further comprising:

responsive to the configuration signals indicating the third configuration mode, operating the bridge circuitry to apply and receive signals from the second data lines and the second control lines according to the third bus protocol at a frequency lower than the first frequency.

* * * * *